United States Patent [19]

Endoh

[11] Patent Number: 5,329,063
[45] Date of Patent: Jul. 12, 1994

[54] LINER ASSEMBLY FOR LINING BRANCH PIPES AND A METHOD FOR MANUFACTURING THE LINER ASSEMBLY

[75] Inventor: Shigeru Endoh, Kasukabe, Japan

[73] Assignee: Get, Inc., Ibaraki, Japan

[21] Appl. No.: 890,200

[22] Filed: May 29, 1992

[30] Foreign Application Priority Data

May 31, 1991 [JP] Japan .................... 3-156095

[51] Int. Cl.$^5$ ............................... F16L 55/16
[52] U.S. Cl. ........................ 138/98; 138/97; 156/287
[58] Field of Search ......... 138/97, 98; 405/150.1; 156/287; 264/269

[56] References Cited

U.S. PATENT DOCUMENTS

| | | | |
|---|---|---|---|
| 3,968,552 | 7/1976 | Hunter | 138/98 |
| 4,064,211 | 12/1977 | Wood | 405/150.1 |
| 4,135,958 | 1/1979 | Wood | 138/97 |
| 4,350,548 | 9/1982 | Zenbayashi et al. | 405/150.1 |
| 4,456,401 | 6/1984 | Williams | 138/97 |
| 4,581,085 | 4/1986 | Wood | 138/97 |
| 4,714,095 | 12/1987 | Müller et al. | 138/98 |
| 4,752,511 | 6/1988 | Driver | 138/98 |
| 4,758,454 | 7/1988 | Wood | 138/98 |
| 4,836,715 | 6/1989 | Wood | 138/98 |
| 4,865,673 | 9/1989 | Shihkin et al. | 156/287 |
| 5,010,440 | 4/1991 | Endo | 138/97 |
| 5,108,533 | 4/1992 | Long, Jr. et al. | 156/287 |
| 5,205,893 | 4/1993 | New et al. | 156/287 |

FOREIGN PATENT DOCUMENTS

| | | | |
|---|---|---|---|
| 0192524 | 8/1989 | Japan | 138/97 |
| 1232022 | 9/1989 | Japan | 138/97 |

*Primary Examiner*—Timothy F. Simone
*Assistant Examiner*—James F. Hook
*Attorney, Agent, or Firm*—Lowe, Price, LeBlanc & Becker

[57] ABSTRACT

A lining assembly for lining the inner wall of a branch pipe connected to a main pipe having a flexible tubular resin-impregnated liner that has one end externally reversed to form a collar to fit the inner wall of the main pipe. A first hermetic film covers the internal wall of the tubular liner and a second hermetic film covers the external wall of the tubular liner. An annular resin-absorbent flat felt backs the collar. A detectable resilient tube consisting of a tubular reinforcement material and a third hermetic film covering the internal wall of the tubular reinforcement material are provided, the upper end portion of the third hermetic film being detachably adhered to the second hermetic film covering the external wall of the flexible tubular resin-impregnated liner near the collar, and the detachable resilient tube enclosing in it a sufficient part of the flexible tubular film-covered liner which is in the vicinity of the collar to thereby support that part of the liner to be erect toward the opening of the branch pipe. A pressure proof-tube consisting of three detachable divisions, contains in it the flexible tubular resin-impregnated liner lengthwise, the front end of the pressure proof-tube being connected to the detachable resilient tube and the rear end being closed.

6 Claims, 11 Drawing Sheets

5,329,063

LINER ASSEMBLY FOR LINING BRANCH PIPES AND A METHOD FOR MANUFACTURING THE LINER ASSEMBLY

FIELD OF THE INVENTION

The present invention relates to a linear assembly used for lining the inner wall of an old or defective branch pipe such as Hume concrete pipe branching out from a main pipe, and also relates to a method for manufacturing such branch pipe liner assembly.

BACKGROUND OF THE PRIOR ART

When an underground utility pipe or an underground industrial pipe, such as sewer pipe, gas pipe, and electric conduit pipe, becomes defective or too old, the pipe is repaired and reinforced without digging the earth to expose the pipe and disassembling the sections of the pipe. This non-digging method of repairing a pipe is known and practiced in the field of civil engineering. Typically, the method is disclosed by Japanese Provisionnal Patent Publication (Kokai) No. 60-242038.

According to the publication, this method of pipe repair comprises inserting a sufficiently long tubular flexible liner bag into the pipe to be repaired by means of a pressurized fluid, like air or water. The tubular liner bag is made of a flexible resin-absorbing material impregnated with a thermosetting resin, and has the outer surface coated with a hermetic film. More particularly, according to the publication, the tubular flexible liner bag is closed at one end and open at the other. The tubular flexible liner bag is first flattened, and, the closed end of the tubular liner bag is tied to a control other. The open end of the tubular liner bag is made to gape wide and is hooked at the end of the defective or old pipe in a manner such that the wide-opened end of the liner completely and fixedly covers and closes the pipe end. A portion of the liner is pushed into the pipe; then, a pressurized fluid is applied to the pushed in portion of the tubular liner such that the fluid urges the tubular liner to enter the defective pipe. Since one end of the tubular liner is hooked at the end of the pipe, it remains there while the rest of the flexible liner bag is turned inside out as it proceeds deeper in the pipe. (Hereinafter, this manner of insertion shall be called "reversing".) When the entire length of the tubular liner bag is reversed (or turned inside out) into the pipe, a control rope holds the closed end of the tubular liner bag to thereby control the length of the tubular liner in the pipe. Then, the reversed tubular liner is pressed against the inner wall of the defective pipe by the pressurized fluid, and the tubular flexible liner is hardened as the thermosetting resin impregnated into the liner is heated, which is effected by heating the fluid filling the tubular liner bag by means of a hot steam, etc. It is thus possible to line the inside wall of the defective or old pipe with a rigid liner without digging the ground and disassembling the pipe sections.

This method is applicable to a pipe branching out from a main pipe as well, and how it is conducted will be described next with reference to FIG. 15.

FIG. 15 is a vertical sectional view of the site, showing the conventional method of lining a pipe branching out from a main pipe. The reference numeral 23 designates a pressure proof bent tube inserted in a main pipe 20. A hermetic flexible bag 11 connected to the end of the tube 23 is reversely inserted in a branch pipe 21 together with a flexible tubular liner 15, and is for pressing the liner 15 onto the inner wall of the branch pipe 21. The bag 11 as well as the tube 23 is removed from the pipes 21, 22 after the pipe repair work is completed. Therefore, the bag 11 must be detachable from the liner 15.

According to this conventional method, first, the pressure proof tube 23 containing the furled flexible bag 11 and liner 15 in it is placed in the main pipe 20 in a manner such that the bent end of the tube 23 faces the entrance to the branch pipe 21, and when pressurized air or the like is supplied into the pressure proof tube 23, the flexible bag 11 together with the liner 15 is inflated and reversed into the branch pipe 21, and the liner 15 is pressed against the inner wall of the branch pipe 21. Then, the liner 15 is hardened by heating, or by some other procedure depending on the hardening property of the material of the liner 15. Finally, the flexible bag 11 is detached from the hard liner 15 and withdrawn from the branch pipe 21, leaving the branch pipe 21 closely lined with the liner 15.

PROBLEMS THE INVENTION SEEKS TO SOLVE

However, in the above-described conventional method for lining branch pipes, the viscous thermosetting resin impregnated in the flexible resin-absorbent material of the tubular liner 15 flows down through the resin-absorbent material, and it does so relatively readily when the branch pipe 21 is steep like the one in FIG. 15. Since only one side of the tubular liner 15 is coated with a hermetic film, that is, only outside before reversing or only inside after reversing, the resin oozes at the lower end of the tubular liner 15 and drops into the main pipe 20.

A method was conceived to let a resin-absorbent material which is coated inside and outside with a hermetic film absorb a fluid thermosetting resin, to thereby obtain a tubular liner impregnated with the thermosetting resin. However, it has been found very difficult to impregnate a layer of a resin-absorbable material coated on both sides with a film with a resin. When one end of the layer was sealed by a resin stopper means such as an adhesive tape, it was found virtually impossible to let the resin-absorbale material in the vicinity of the sealed end absorb the thermosetting resin.

Also, in the conventional practice, it was necessary to tailor the hermetic flexible bags 11 to suit different lengths of the branch pipes 21, and it was also necessary to change the hermetic bags 11 each time the length of the branch pipe 21 differed.

Furthermore, when a branch pipe formed a sharp angle with the main pipe, it was often difficult to withdraw the hermetic bag 11 from the newly lined branch pipe, as the bag 11 is somehow hooked on the acute joint of the pipes.

Also, there has been proposed a method wherein a tubular liner having a collar at one end as the resin stopper means is encapsuled in a resilient guide pipe shaped to fit in the branch pipe, and the guide pipe is drawn into the branch pipe and turned until the collar of the tubular liner fits on the inner wall of the main pipe. However, in this method, when the branch pipe is relatively long or bent, it is difficult to turn the resilient guide pipe, and therefore impossible to fit the collar of the tubular liner on the inner wall of the main pipe.

The present invention was developed in view of the above problems, and it is, therefore, a principle object of the invention to provide a liner assembly for lining the inner walls of branch pipes, especially those which are steep, long and/or bent, such that there will be no dripping of thermosetting resin into the main pipe. A method of manufacturing such a branch pipe liner assembly is also proposed.

MEANS TO SOLVE THE PROBLEMS

In order to attain the object of the invention, there is provided a lining assembly for lining the inner wall of a branch pipe branching out from a main pipe, which assembly comprises (a) a flexible tubular resin-impregnated liner having one end externally reversed to form a collar and having a length consistent with the length of the branch pipe, said collar being warped and hardened to have a curvature same as that of the inner wall of the main pipe, (b) a first hermetic film covering the internal wall of the tubular liner, (c) a second hermetic film covering the external wall of the tubular liner, (d) an annular resin-absorbent flat felt with which said collar is backed, (e) a detachable resilient tube consisting of a tubular reinforcement material and a hermetic film covering the internal wall of the tubular reinforce material, the upper end portion of said film being free of the reinforcement material and detachably adhered to said second hermetic film covering the external wall of the flexible tubular resin-impregnated liner near the collar and said detachable resilient tube enclosing in it a sufficient part of said flexible tubular film-covered liner which is in the vicinity of the collar to thereby support that part of the liner in an erect position toward the opening of the branch pipe, and (f) a pressure resistant tube consisting of three detachable divisions containing in it said flexible tubular resin-impregnated liner lengthwise, the front end of said pressure proof tube being hermetically connected to said detachable resilient tube and the rear end being closed.

A means is provided to press the collar backed with the annular resin-absorbable flat felt onto the inner wall of the main pipe.

Further, an air vent means may be provided at the other end of the film-covered resin-impregnated liner for releasing air and an annular resin-absorbent flat felt adhered to the back side of the collar may preferably have a protrusion means along the inner edge thereof which protrudes such that when said flexible tubular resin-soaked liner is laid over the protrusion, the protrusion causes the liner to produce a visible elevation.

A guide tube is connected between the front end of said pressure resistant tube and be press means.

Also, a method is provided for making said branch pipe lining assembly which comprises the steps of: covering the outer wall of the flexible tubular resin-absorbable liner with the second hermetic film; reversing one end of the resin-absorbent absorbent liner to thereby form a collar; hardening the collar; backing the collar with the annular resin-absorbent flat felt; adhering one end of the detachable resilient tube to the second hermetic film covering the external wall of the flexible tubular resin-absorbent liner near the collar and, attaching one end of the first hermetic film to that side of the hardened collar that is not backed with the annular resin-absorbent flat felt; charging hardenable resin into the first hermetic film; reversing the first hermetic film into the flexible tubular resin-absorbent liner while drawing air from the tubular resin-absorbent liner at the rear end of it to thereby soak the tubular resin-absorbent liner with the hardenable resin.

EFFECTS

When the branch pipe liner assembly of the present invention is employed, the detachable resilient tube hermetically connects the pressure proof tube with the branch pipe liner so that the same detachable resilient tube is used irrespective of the length of the branch pipe to be lined. Therefore, it is possible to do away with the conventional hermetical tube and guide pipe, and even when the branch pipe is steep or long or bent, the branch pipe can be lined effectively and completely.

Also, the flexible tubular resin-absorbent liner is covered both internally and externally with first and second hermetic films so that even when the branch pipe is steep the resin soaked in to the liner does not flow through the liner. Furthermore, when the resin is impregnated into the flexible tubular resin-absorbent liner, as the first hermetic film is reversed into the liner the air in the liner is drawn out so that the resin which is pressed on the liner is sucked into the liner and, therefore, the liner becomes soaked with the resin throughout the whole length of it.

The above and other objects and features of the invention will appear more fully hereinafter in the following description given in connection with the accompanying drawings and the novelty thereof pointed out in the appended claims.

DESCRIPTION OF THE PREFERRED EMBODIMENTS

An embodiment of the invention, which is considered the best mode, will now be described with reference to the attached drawings.

Figure 2:
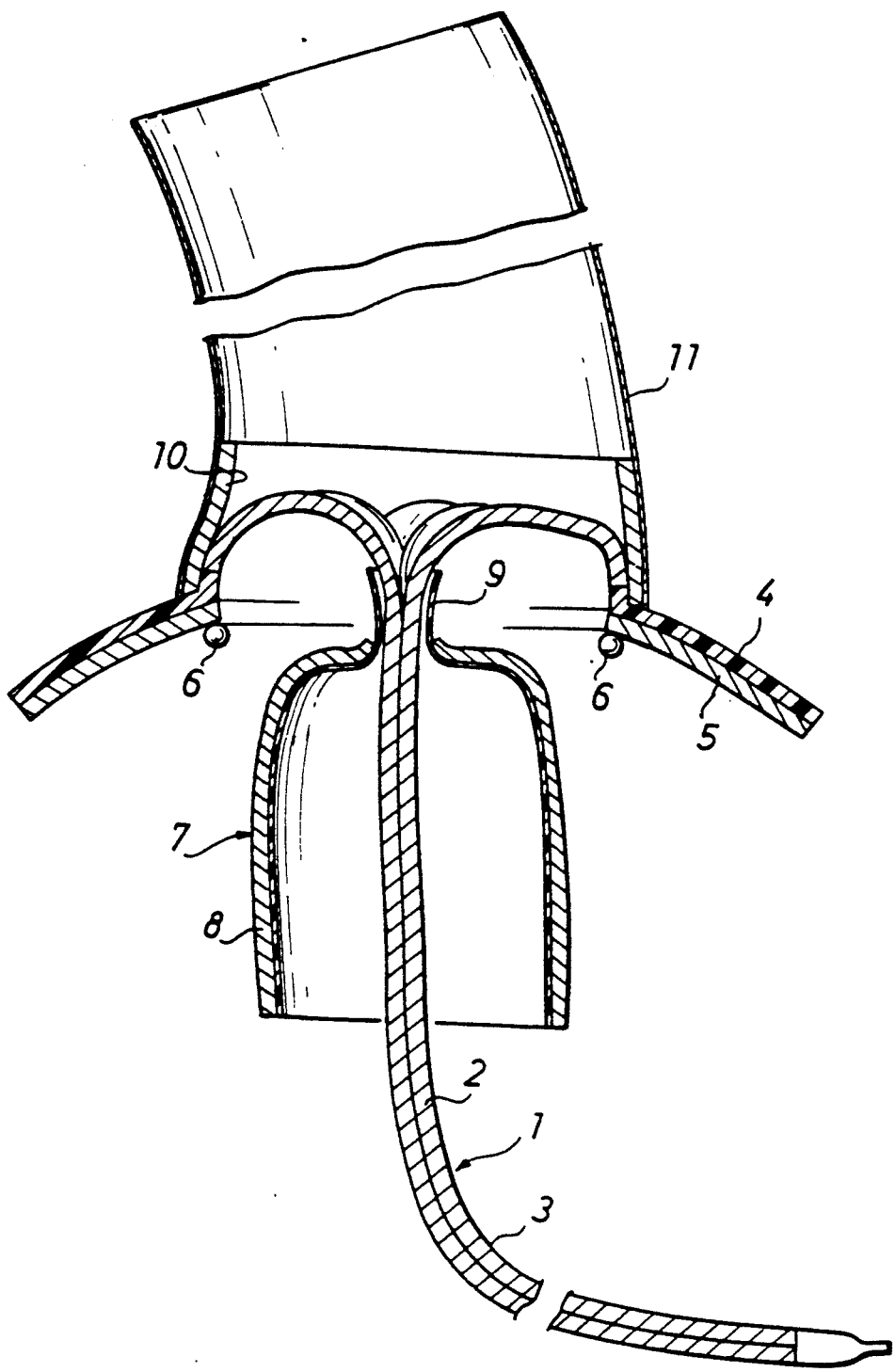
FIG. 2 is a drawing useful in explaining how a branch pipe liner set of the invention is fabricated.
Figure 3:
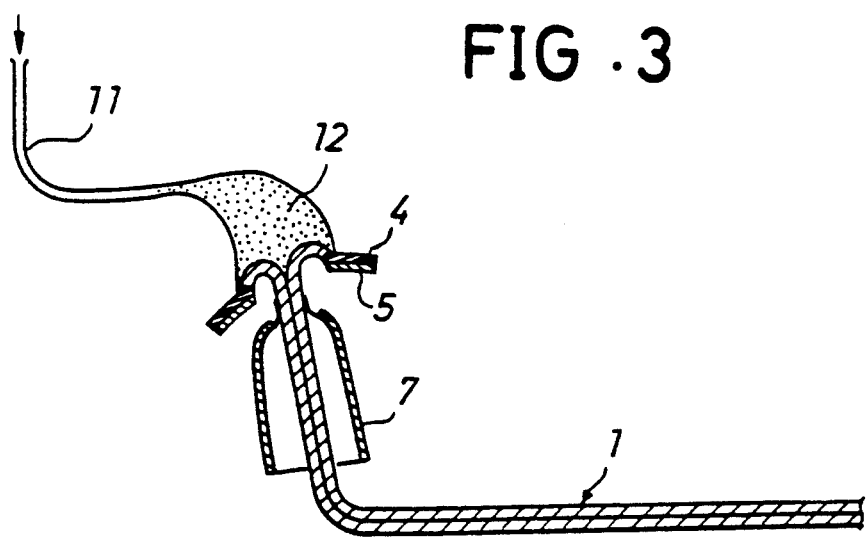
FIG. 3 is a drawing useful in explaining how a branch pipe liner set of the invention is fabricated.
Figure 4:
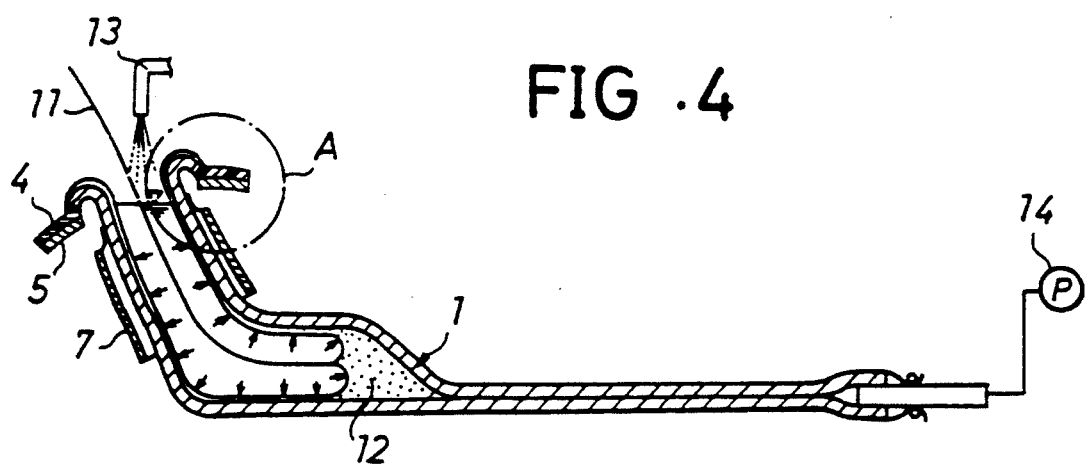
FIG. 4 is a drawing useful in explaining how a branch pipe liner set of the invention is fabricated.
Figure 5:
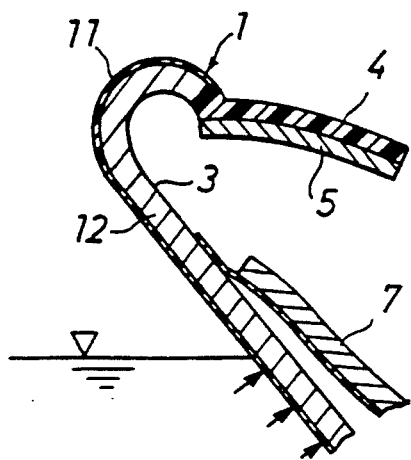
FIG. 5 is an enlarged view of the portion A of FIG. 4
Figure 6:
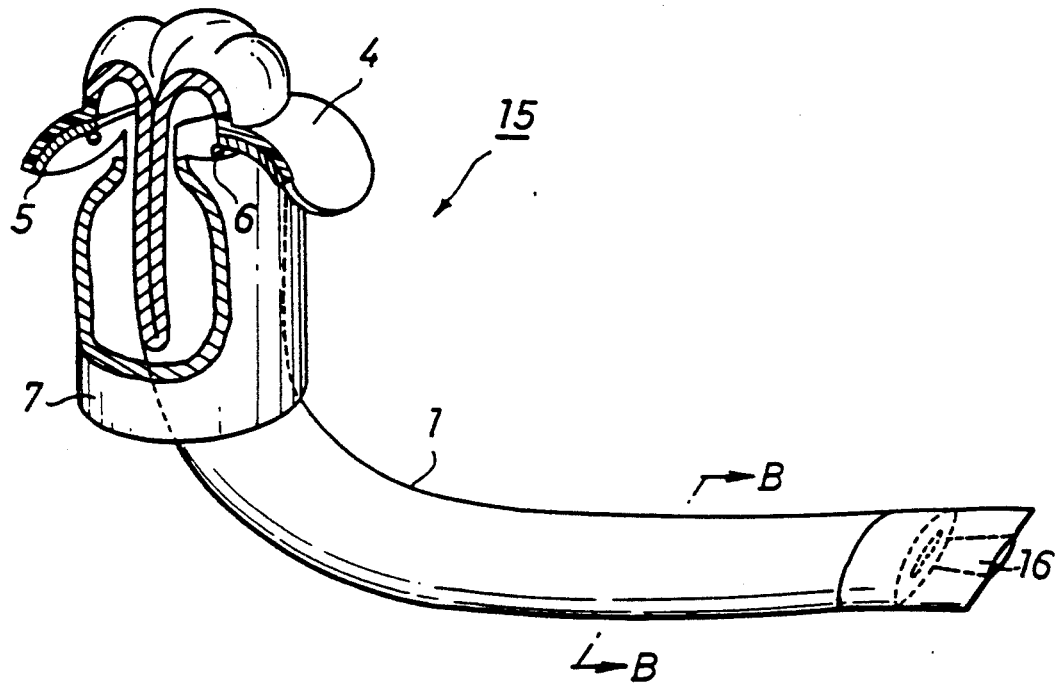
FIG. 6. is a partially broken perspective view of the branch pipe liner set.
Figure 7:
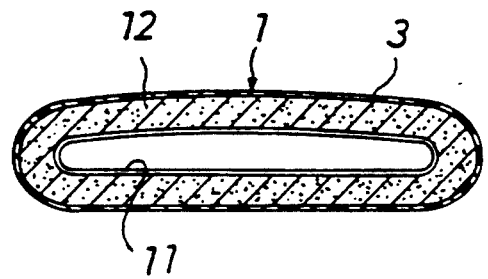
FIG. 7 is an enlarged cross-sectional view taken on line B—B.

FIGS. 1 through 7 are drawings to show the procedure of manufacturing a branch pipe liner set, and FIG. 5, in particular, is an enlarged view of the portion A of FIG. 4, and FIG. 7 is an enlarged cross section taken on line B—B of FIG. 6.

Figure 1:
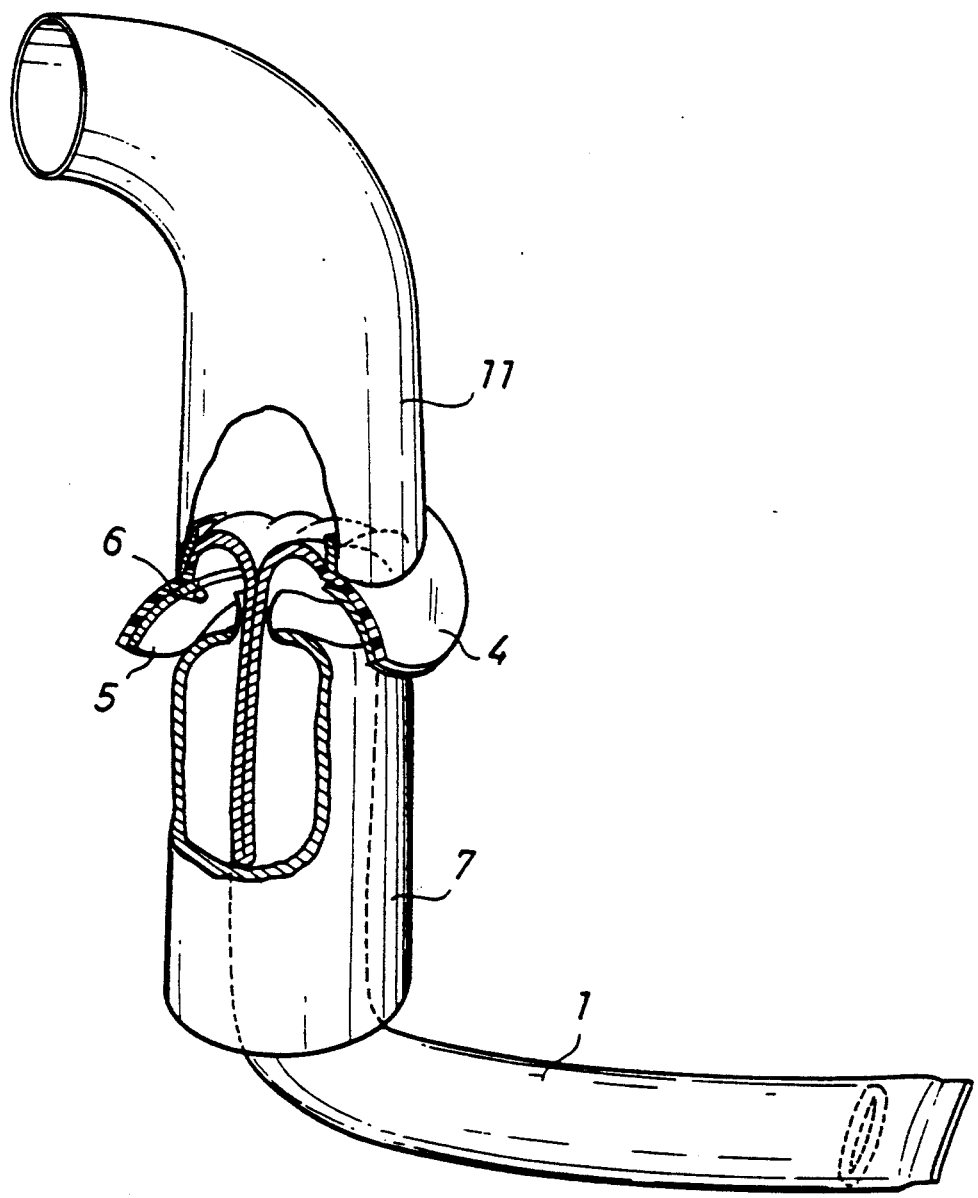
FIG. 1 is a drawing useful in explaining how a branch pipe liner set of the invention is fabricated.

Reference numeral 1 designates a flexible tubular liner which consists of a resin-absorbent material 2 coated externally with a hermetic film 3 and which has one end reversed externally to form a collar 4, as shown in FIGS. 1 and 2. The resin-absorbent material 2 is covered with the film 3 by the conventional method. The collar 4 is spread wide and warped and hardened in a shape such that it fits that part of the inner wall of the main pipe which forms the brink of the opening of the branch pipe, that is, the curvature of the warped collar is equal to that of the inner wall of the main pipe, and the outer diameter of the collar 4 is substantially greater than the diameter of the branch pipe. The collar 4 is thus hardened beforehand as the thermosetting resin impregnated in it is heated. An annular resin-absorbent flat felt 5 is adhered to the back side of the collar 4. More than a few beads 6 (four or eight of them, for example) are evenly fixed on the annular felt 5 in the vicinity of the brink of the annular felt 5. It is possible to obtain the same intended result if, in place of these beads 6, the annular flat felt 5 is bent a little and thus formed with an inner rim.

A detachable resilient tube 7 which, as shown in FIG. 2, consists of a tubular reinforce material 8 coated internally with a highly hermetic film 9, the upper end of the film 9 being free of the material 8 and detachably adhered to the tubular liner 1 over the hermetic film 3 near the collar 4. As shown, the detachable tube 7 is not long and only a short length of the tubular liner 1 in the vicinity of the collar 4 is inside the detachable tube 7.

Also, as shown in FIG. 2, a tubular resin-absorbable felt 10 is fixed at the collar 4 of the tubular liner 1, and one end of a highly hermetic external film tube 11 is connected to the external surface of the tubular felt 10.

When one end of the external film tube 11 is thus connected to the tubular liner 1, a measured amount of a thermosetting resin 12 is injected into the external film tube 11 from the free end of it, as shown in FIG. 3, and the external film tube 11 is reversed into the tubular liner 1 so much that the resin 12 is entirely pushed inside the tubular liner 1; then, the external film tube 11 is regularly reversed into the tubular liner 1 by means of the water supplied from a hose 13, as shown in FIG. 4. Simultaneously as this, a vacuum pump 14, which is connected at the other end (right end, as viewed in FIG. 4) of the tubular liner 1, is operated to draw air from the tubular liner 1 so as to facilitate permeation of the resin 12 through the tubular liner 1. As shown in FIG. 5, the charged water urges the film tube 11 to be pressed on the flexible tubular liner 1.

In other words, the external film tube 11 is reversed into the tubular liner 1 by the water pressure, and the thermosetting resin 12 is pushed and transferred toward said right end of the tubular liner 1, and since the air in the tubular liner 1 is being drawn out, the thermosetting resin 12 can easily soak through the entire thickness and the length of the liner 1. When reversing of the external film tube 11 is completed, the head of the reversed tube 11 which reaches said right end of the tubular liner 1 is cut open, whereupon the the water gushes out from the external film tube 11, and the liner 1 now coated with films both internally and externally flattens again.

Then, an air vent valve 16 is fabricated at said right end of the tubular liner 1 by attaching a cut from a film tube similar as the film tube 3, as shown in FIG. 6; a narrow air passage is formed through which the air can escape. Thus, a branch pipe liner set 15 is prepared. In the tubular pipe liner 1, shown in FIG. 7, the inner wall of the resin-absorbable material 2 impregnated with the thermosetting resin 12 is coated with the external hermetic film tube 11, and the external wall with the hermetic film tube 3.

Next, the procedure of lining a branch pipe with the branch pipe liner set 15 will be explained with reference to FIGS. 8 through 14. Incidentally, FIGS. 8 through 13 are cross sections showing a main pipe, a branch pipe and elements used in the lining operation; FIG. 14 is an enlarged view of portion C of FIG. 13.

Figure 8:
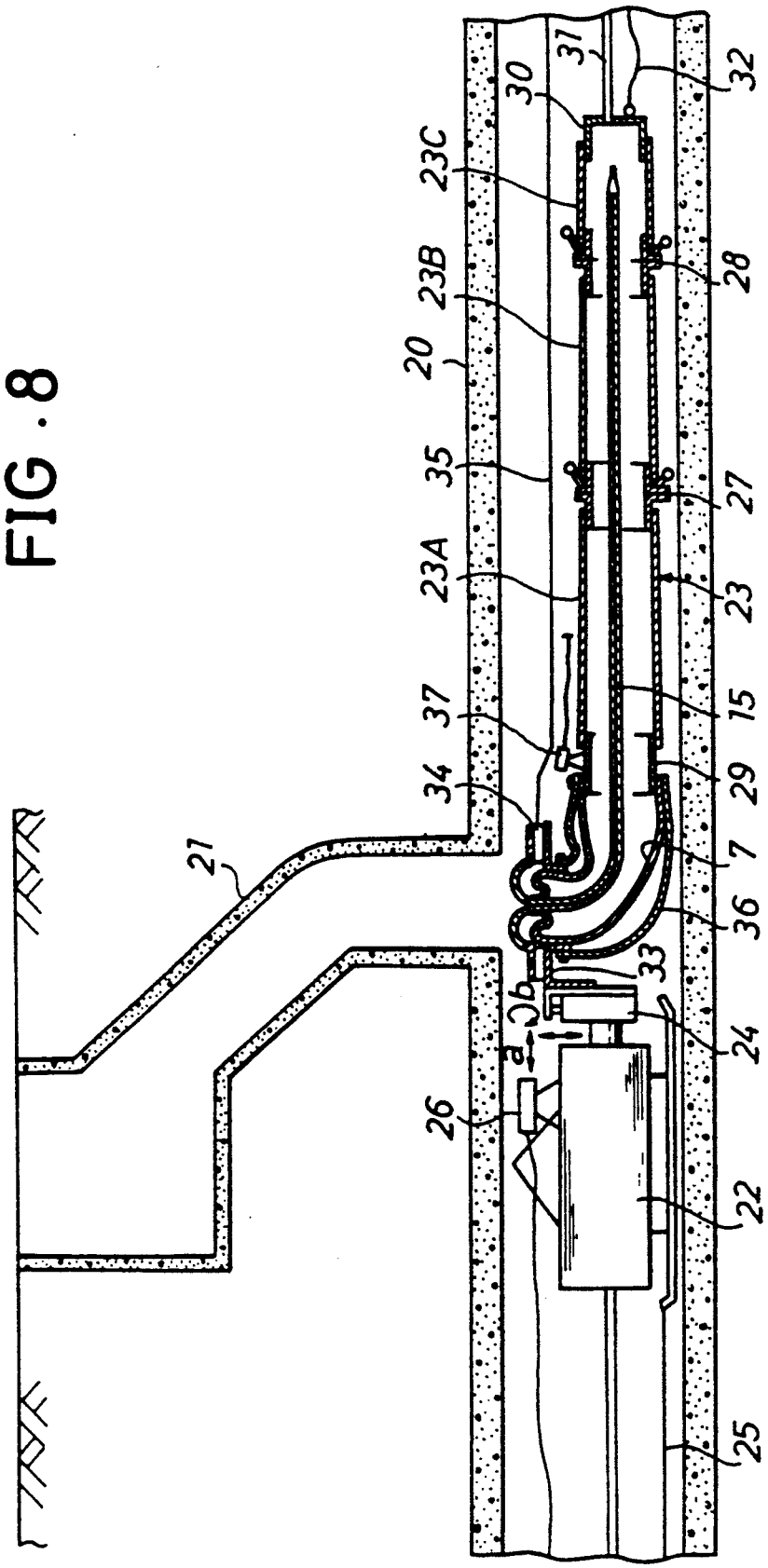
FIG. 8 is a cross-sectional view showing how a branch pipe is lined by means of the branch pipe liner assembly of the invention.

In FIG. 8, the reference numeral 20 designates a main pipe, and 21 a narrow branch pipe extending from the main pipe 20. A setting robot 22, a pressure proof tube 23, etc. are placed in the main pipe 20. The setting robot 22 is driven by means of hydraulic pressure and is capable of moving its head 24 forward and backward and upward and downward and also turning it clockwise and anticlockwise about the neck-like shaft. A pull rope 25 is tied to the setting robot 22, and a TV camera 26 for monitoring is mounted on the top of the setting robot 22.

The pressure proof tube 23 consists of three divisions: first division 23A, second division 23B, third division 23C, and these divisions are connected in a row by means of clip-on type joints 27, 28 in a manner such that they are easily detached from one another by turning the levers to release the clip-on type joints 27, 28. Therefore, if a number of replaceable second divisions 23B having different lengths are made available, for example, then it is possible to adjust the length of the overall pressure proof tube 23 by selecting different second divisions 23B.

As shown in FIG. 8, the front end of the pressure proof tube 23 is provided with a ring 29 and the rear end of it is closed with a cup 30. To the cup 30 is connected an air hose 31 and a pull rope 32. The air hose 31 is connected at the other end to an air compressor, not shown.

In the pressure proof tube 23 is enclosed the branch pipe liner set 15 of the invention, and the open end of the detachable tube 7 of the liner set 15 is connected to the ring 29. The collar 4 of the branch pipe liner set 15 is supported by a setting arm 33, which is ring-like and detachably attached to the head 24 of the setting robot 22, and a ring-like air mat 34 is intervened between the collar 4 and the setting arm 33. Incidentally, this air mat 34 is connected to an air compressor, not shown, by way of an air hose 35.

Further, the setting arm 33 is connected to the ring 29 via a guide tube 36, and the length of the guide tube 36 is smaller than that of the detachable tube 7. Incidentally, a small monitor TV camera 37 is mounted on the ring 29.

By pulling and letting go the pull ropes 25 and 32, it is possible to move the setting robot 22, the pressure proof tube 23 and others altogether in the lengthwise direction of the main pipe 20. By observing the position of the collar 4 of the branch pipe liner set 15 relative to the branch pipe 21 by means of the TV cameras 26 and 37, the branch pipe liner set 15 is shifted until the collar 4 is brought exactly below the opening of the branch pipe 21.

Figure 9:
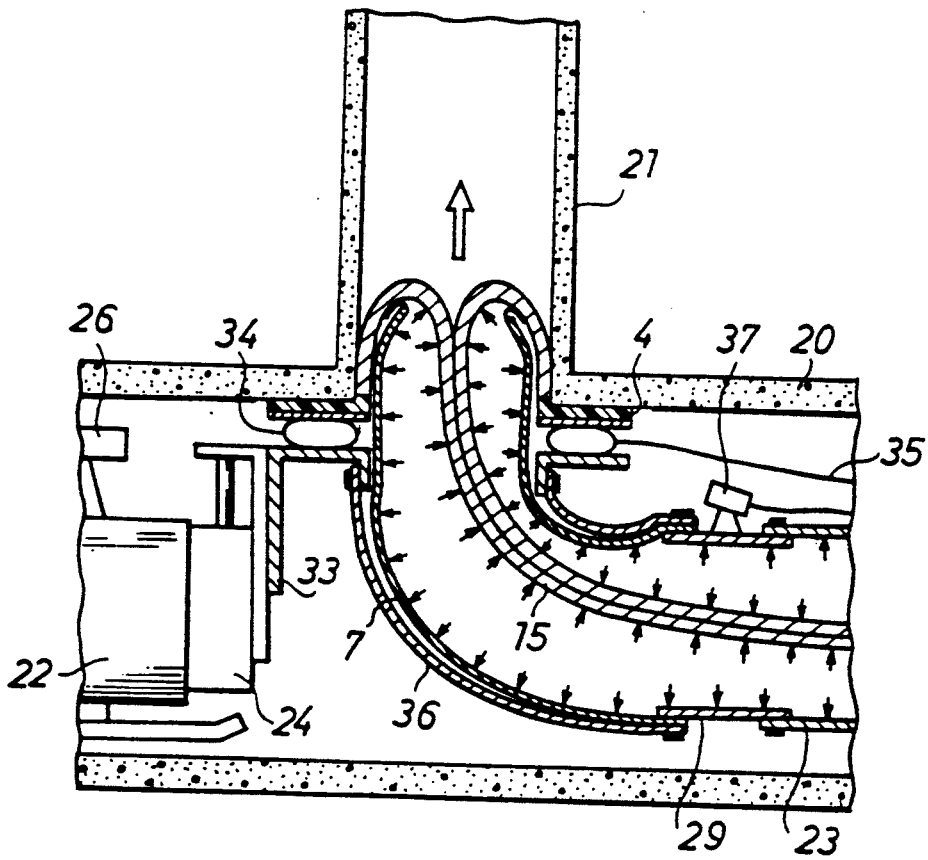
FIG. 9 is a cross-sectional view showing how a branch pipe is lined by means of the branch pipe liner assembly of the invention.
Figure 10:
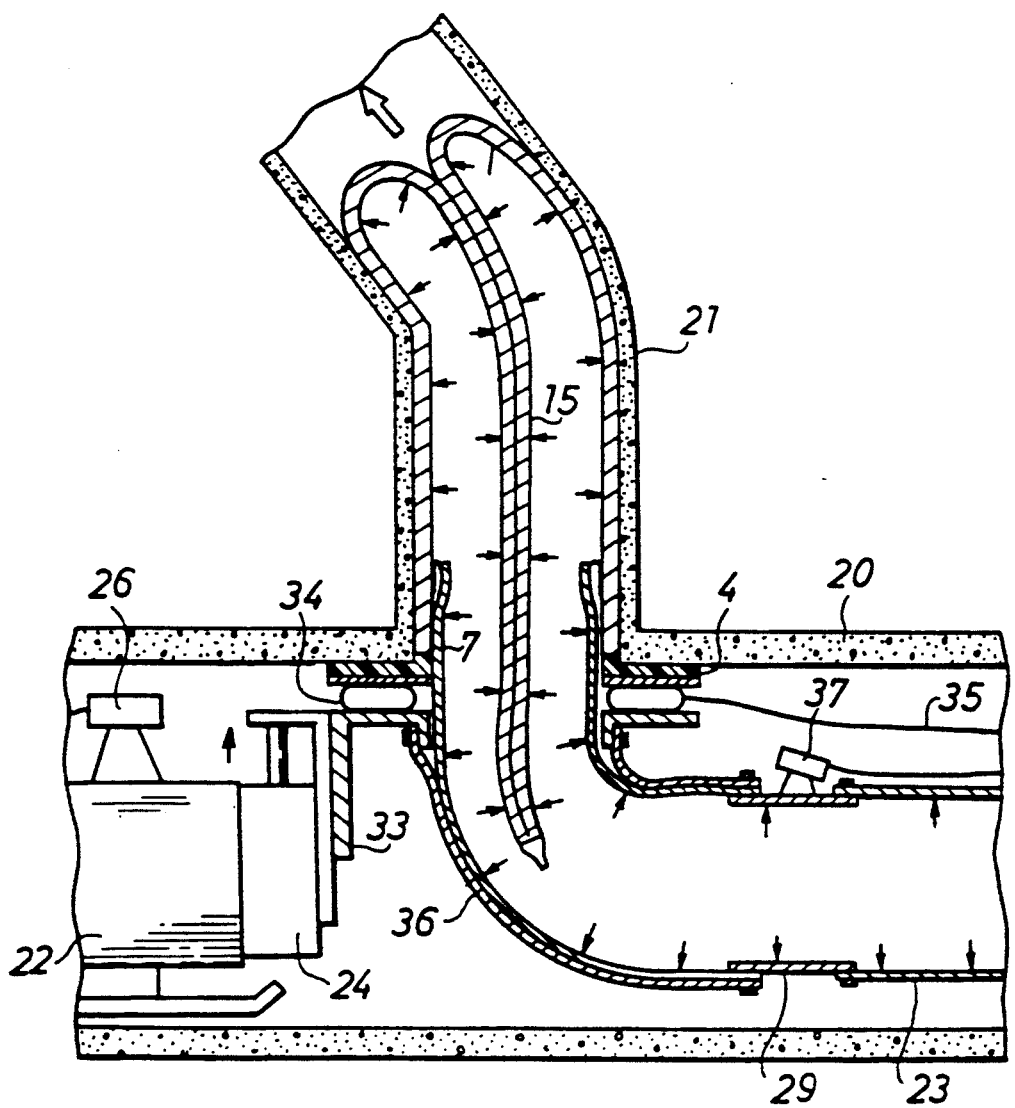
FIG. 10 is a cross-sectional view showing how a branch pipe is lined by means of the branch pipe liner assembly of the invention.

Next, the air compressor, not shown, is driven to supply the pressure proof tube 23 and the air mat 34 with compressed air, whereupon, as shown in FIG. 9, the air mat 34 is inflated and urges the collar 4 of the branch pipe liner set 15 onto the brink of the opening of the branch pipe 21 to thereby close the opening completely. Also, the branch pipe liner set 15 in the pressure proof tube 23 is reversed into the branch pipe 21, as the compressed air supplied into the pressure proof tube 23 urges the pressure proof tube 23 to inflate, as shown in FIGS. 9 and 10. Incidentally, the tubular pipe liner 1 of the branch pipe liner set 15 is coated inside with the external film tube 11 and outside with the film 3 (before resversing) so that even if the branch pipe 21 is steep, the thermosetting resin soaked in the tubular pipe liner 1 will not flow down.

Figure 11:
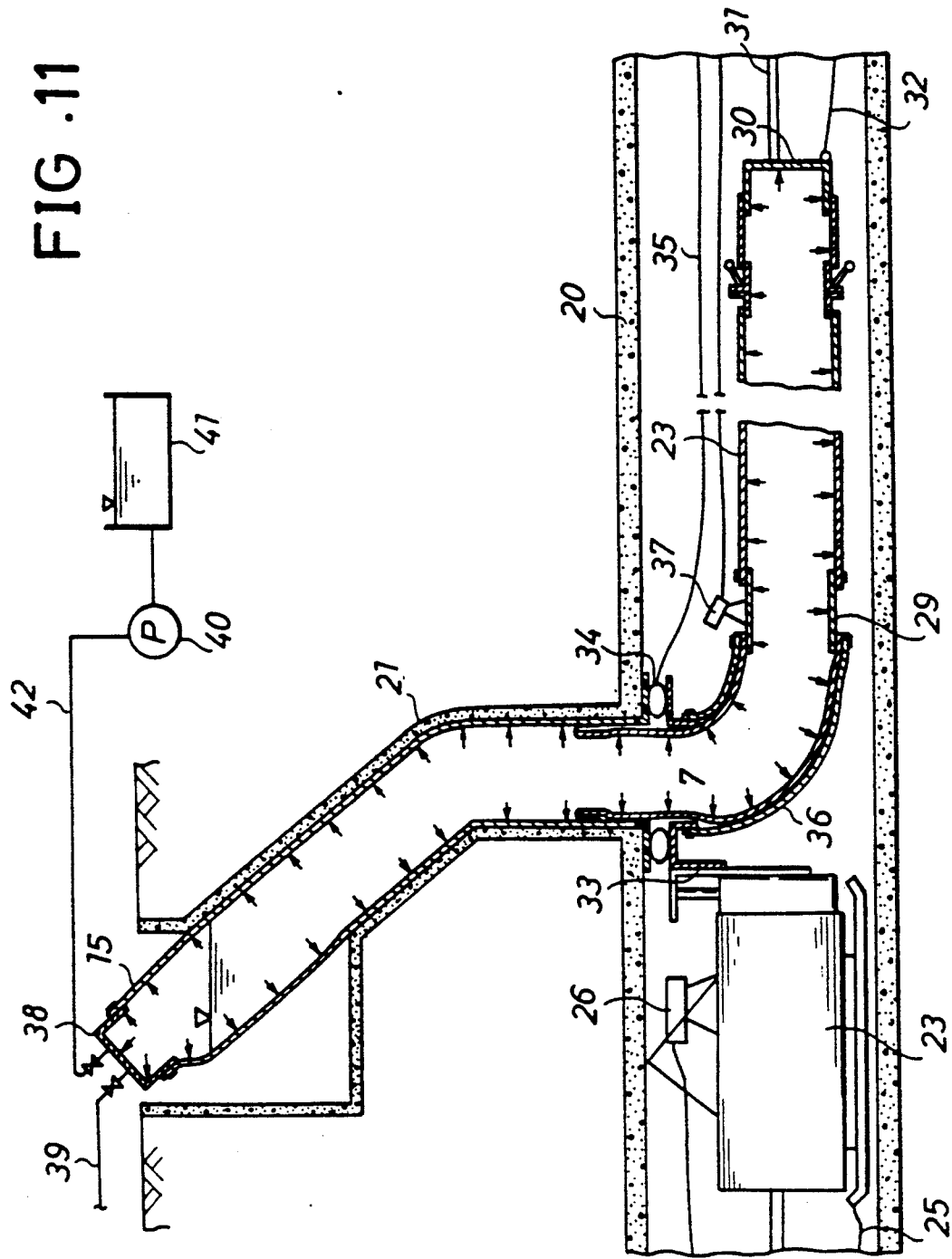
FIG. 11 is a cross-sectional view showing how a branch pipe is lined by means of the branch pipe liner assembly of the invention.

When the insertion of the branch pipe liner set 15 into the branch pipe 21 by reversing is completed, the air blows out through the valve 16. Then, the upper end of the branch pipe liner set 15 is cut off and closed with a cup 38, to which are connected terminals of an air hose 39 and a hot water hose 42, as shown in FIG. 11. Compressed air is supplied into the branch pipe liner set 15 by way of the air hose 39 to thereby keep the tubular pipe liner 1 being inflated and urged on the inner wall of the branch pipe 21; at the same time, a pump 40 is operated so that hot water is drawn from a tank 41 and injected into the branch pipe liner set 15 by way of the hot water hose 42. As the result, the thermosetting resin (hardenable resin) 12 soaked in the tubular pipe liner 1 of the branch pipe liner set 15 is heated and hardens, and thus the branch pipe 21 is internally lined with the hardened tubular pipe liner 1 of the branch pipe liner set 15, and the branch pipe 21 is reinforced.

Figure 12:
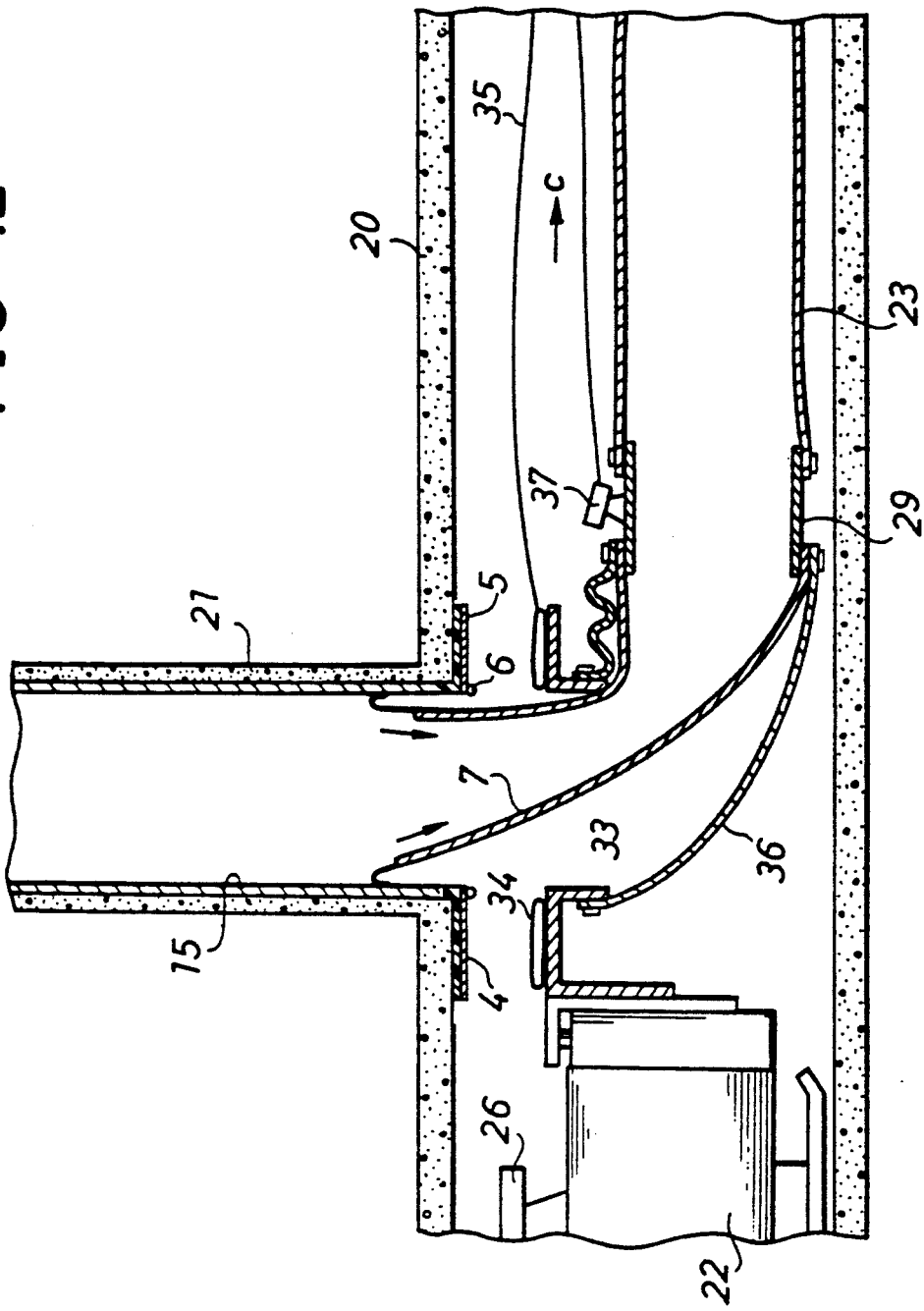
FIG. 12 is a cross-sectional view showing how a branch pipe is lined by means of the branch pipe liner assembly of the invention.

When the branch pipe 21 is lined as described above, the hot water is drawn out from the branch pipe liner set 15, and, as shown in FIG. 12, the pressure proof tube 23 is moved in the direction indicated by the arrow C. Since the pressure proof tube 23 and the setting robot 22 are connected to each other by means of the guide tube 36, the setting robot 22 is drawn in the direction C as the pressure proof tube 23 is moved, and consequently, the detachable tube 7 temporarily attached to the branch pipe liner set 15 is detached therefrom and drawn away through the hollow of the main pipe 20 together with the pressure proof tube 23, etc.

As described above, according to the lining method of the present embodiment of the invention, the hermetical junction between the pressure proof tube 23 and the branch pipe liner set 15 is effected by means of the detachable tube 7; and the same detachable tube 7 can be used for branch pipes of different lengths. Therefore, it is now possible to dispense with the conventional pressure proof tubes and guide pipes, and furthermore, it is possible to effectively line such branch pipes that are steep, long or excessively bent.

Figure 13:
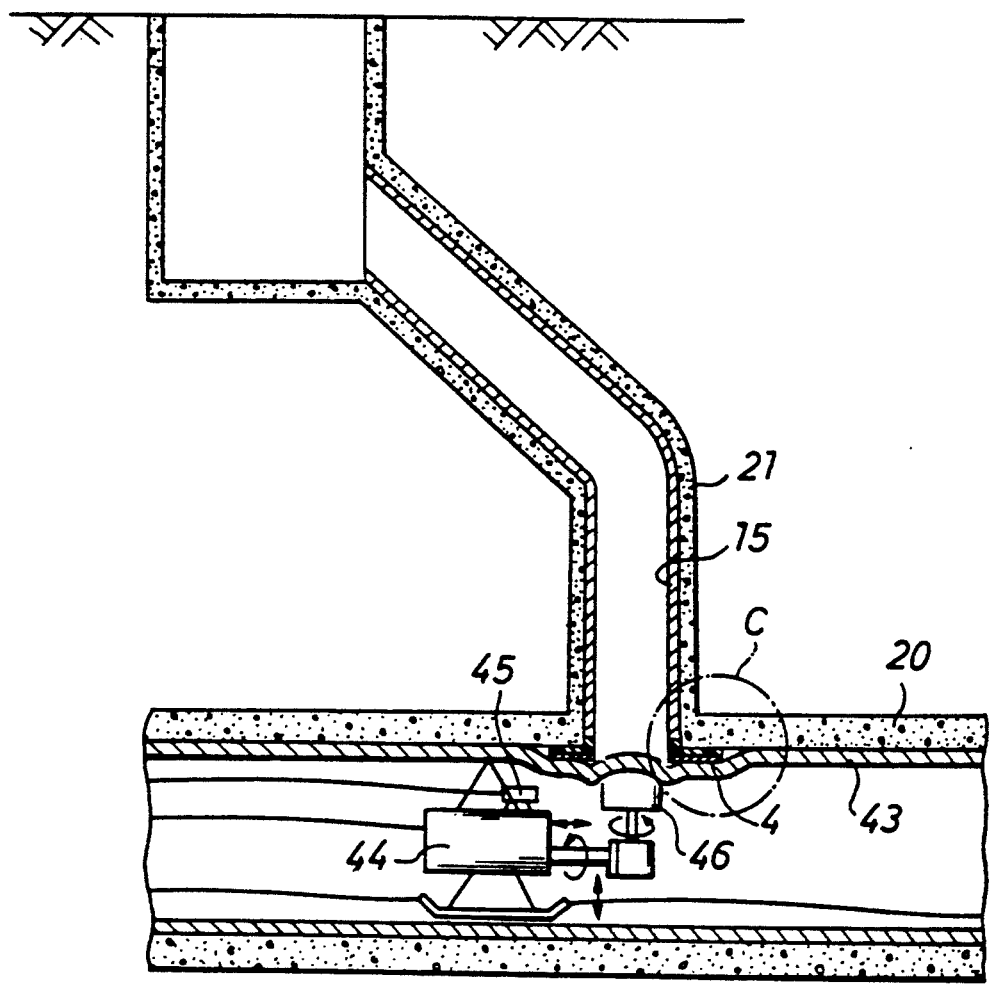
FIG. 13 is a cross-sectional view showing how a branch pipe is lined by means of the branch pipe liner assembly of the invention.
Figure 14:
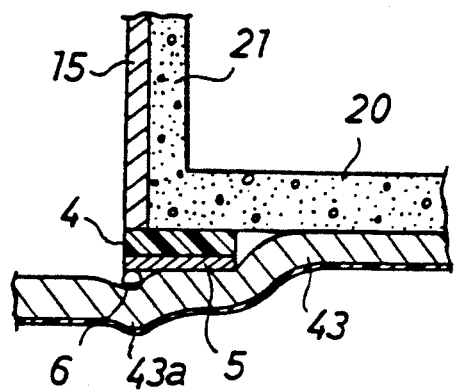
FIG. 14 is an enlarged view of the portion C of FIG. 13.
Figure 15:
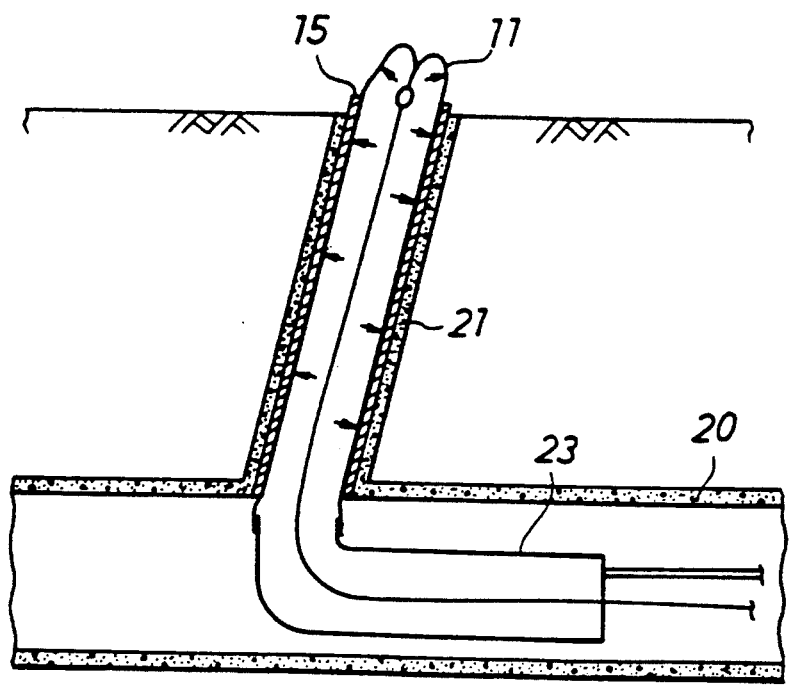
FIG. 15 is a cross-sectional view showing how a conventional branch pipe lining operation is conducted.

When the lining operation on the branch pipe 21 is thus completed, the main pipe 20 is lined next with a tubular pipe liner 43, as shown in FIG. 13, and the liner 43 is hardened to repair and reinforce the main pipe 20. Now, when the tubular pipe liner 43 is reversed into the main pipe 20, the annular flat felt 5 (FIG. 14), which is attached to the collar 4 of the branch pipe liner set 15, gets soaked with the thermosetting resin that transfers from the tubular pipe liner 43 in which it is richly contained; then, when the thermosetting resin contained in the liner 43 is thermally hardened, the thermosetting resin contained in the felt 5 simultaneously hardens with it with the result that the annular flat felt 5 and the tubular pipe liner 43 are merged into one integral body; as the result, the tubular pipe liner 1 in the branch pipe 21 and the tubular pipe liner 43 in the main pipe 20 are connected and become one body so that the joint between them obtains high sealability to stop leakages of gases as well as liquids.

Since a plurality of beads 6 are fixed at the collar 4 of the branch pipe liner set 15 along the brink of the opening of the branch pipe 21, the tubular pipe liner 43 as reversed inside the main pipe 20 produces a plurality of elevations 43a where the beads 6 are, as shown in FIG. 14. Therefore, in determining the position of a hydraulically-operated cutter 44, which is introduced into the main pipe 20, as shown in FIG. 13, so as to cut open the tubular pipe liner 43 to connunicate the main pipe 20 with the branch pipe 21, it is possible to bring the cutter 44 into the right position with high precision by observing the elevations 43a as the visual guide through a TV camera 45 mounted on the cutter 44. Since, the cutter 44 is set at the right position, the cutter 44 will not cut the collar 4 of the branch pipe liner set 15 by mistake.

Incidentally, in the present embodiment, although an air mat 34 is placed between the collar 4 of the branch pipe liner set 15 and the setting arm 33, it is possible to employ a resiliant means such as rubber and springs in place of the air mat, and it is also possible to employ fluid jet between the collar 4 and the setting arm 33 to urge the collar 4 against the brink of the opening of the branch pipe 21.

As the hardenable resin, a thermosetting resin is used in the embodiment, but it is possible to employ a photochemical resin which hardeneds when exposed to light. The heating means for a thermosetting resin may be hot water, hot steam, electric heater, or anything that imparts sufficient heat. In the embodiment hot water is injected, but it is possible to sprinkle it over the resin.

RESULT OF THE INVENTION

As is clear from the above embodiment of the invention, a novel lining assembly for lining the inner wall of a branch pipe is contrived, which assembly comprises (a) a flexible tubular resin-soaked liner having one end externally reversed to form a collar and having a length consistent with the length of the branch pipe, said collar being warped and hardened to have a curvature same as that of the inner wall of the main pipe, (b) a first hermetic film covering the internal wall of the tubular liner, (c) a second hermetic film covering the external wall of the tubular liner, (d) an annular resin-absorbable flat felt with which said collar is backed, (e) a detachable resiliant tube consisting of a tubular reinforce material and a hermetic film covering the internal wall of the tubular reinforce material, the upper end portion of said film being free of the reinforce material and detachably adhered to said second hermetic film covering the external wall of the flexible tubular resin-soaked liner near the collar and said detachable resiliant tube enclosing in it a sufficient part of said flexible tubular film-covered liner which is in the vicinity of the collar to thereby support that part of the liner to errect toward the opening of the branch pipe, and (f) a pressure proof tube consisting of three detachable divisions containing in it said flexible tubular resin-soaked liner lengthwise, the front end of said pressure proof tube being connected to said detachable resiliant tube and the rear end of it being closed; hence, even when the branch pipe is steep, long or excessively bent, it is possible to line the branch pipe effectively and leakless.

While the invention has been described in its preferred embodiment, it is to be understood that modifications will occur to those skilled in that art without departing from the spirit of the invention. The scope of the invention is therefore to be determined solely by the appended claims.

What is claimed is:

1. A lining assembly for lining the inner wall of a branch pipe branching out from a main pipe, comprising:
    a flexible tubular resin-impregnated liner having one end externally reversed to form a collar and having a length consistent with the length of the branch pipe, said collar being warped and hardened to have a curvature same as that of an inner wall of the main pipe;
    a first hermetic film covering an external wall of the tubular liner;
    a second hermetic film covering an external wall of the tubular liner;
    a detachable resilient tube consisting of a tubular reinforcement material and a third hermetic film covering an internal wall of said tubular reinforcement material, an upper end portion of said third hermetic film being free of the reinforcement material and detachably adhered to said second hermetic film covering the external wall of the flexible tubular resin-impregnated liner near the collar and said detachable resilient tube enclosing a sufficient length of said flexible tubular film-covered liner which is in the vicinity of the collar to support that part of the liner to be erect; and
    an annular resin-absorbent flat felt with which said collar is backed.

2. The lining assembly as claimed in claim 1, further comprising:
    a pressure-resistant tube consisting of three detachable divisions containing said flexible tubular resin-impregnated liner lengthwise, a front end of said pressure-resistant tube being hermetically connected to said detachable resilient tube and a rear end of said pressure-resistant tube being closed.

3. The lining assembly as claimed in claim 2, further comprising:
    press for pressing the collar backed with the annular resin-absorbent flat felt onto the inner wall of the main pipe.

4. The lining assembly as claimed in claim 2, further comprising:
    an air vent means provided at the other end of the film-covered resin-impregnated liner for releasing air.

5. The lining assembly as claimed in claim 2, wherein;
    said annular resin-absorbent flat felt adhered to the back side of the collar has a protrusion means along an inner edge thereof, said protrusion being formed so that when a layer of liner is laid over the protrusion the protrusion causes the liner to produce a visible elevation.

6. The lining assembly as claimed in claim 3, further comprising:
    a guide tube connected between the front end of said pressure-resistant tube and said press means.

* * * * *